Figure 5:
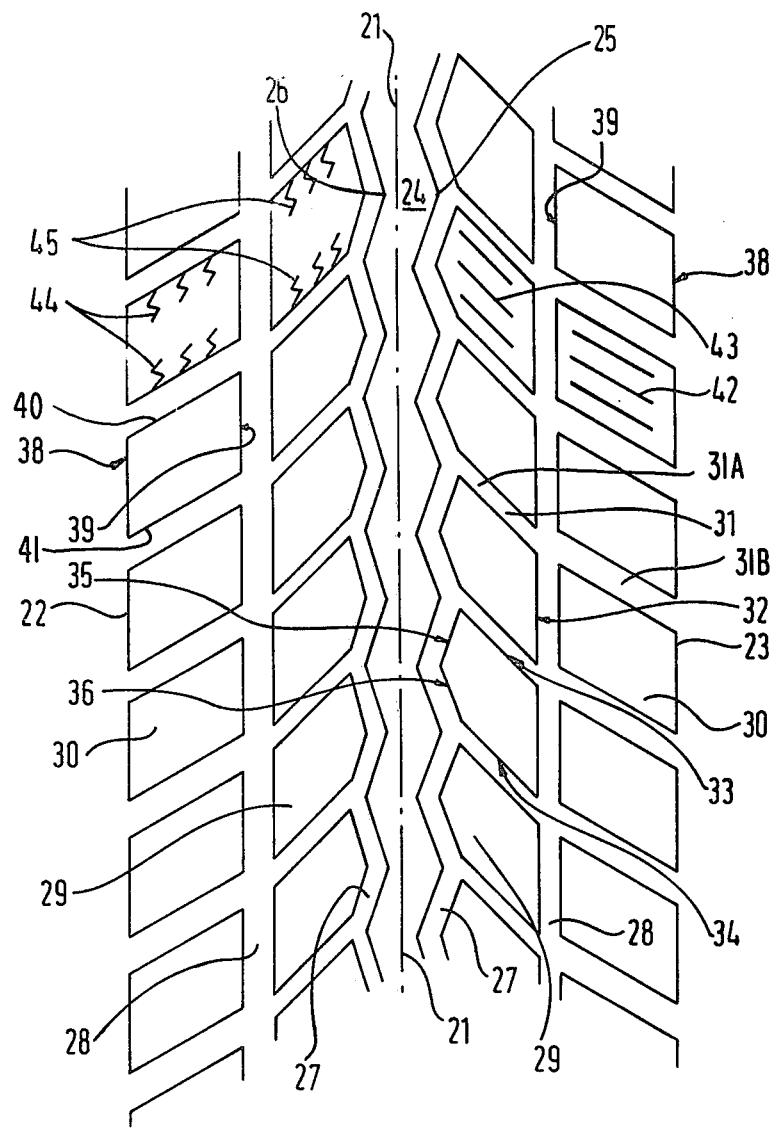

United States Patent [19]

Williams

[11] 4,299,264
[45] Nov. 10, 1981

[54] TIRES

[75] Inventor: Arthur R. Williams, Birmingham, England

[73] Assignee: Dunlop Limited, London, England

[21] Appl. No.: 138,350

[22] Filed: Apr. 8, 1980

[30] Foreign Application Priority Data

Apr. 12, 1979 [GB] United Kingdom ............... 13141/79

[51] Int. Cl.³ .............................................. B60C 11/00
[52] U.S. Cl. ............................ 152/209 R; 152/354 R; D12/145
[58] Field of Search ........... 152/209 D, 209 R, 209 B, 152/209 NT, 209 WT, 352 R, 354 R, 354 RB; D12/140, 141, 145, 147

[56] References Cited

U.S. PATENT DOCUMENTS

| | | | |
|---|---|---|---|
| 2,109,691 | 3/1938 | D'Ayguesvives | 152/209 R |
| 2,770,279 | 11/1956 | Harrison | 152/209 R |
| 3,705,613 | 12/1972 | Verdier | 152/209 R |
| 3,998,256 | 12/1976 | Verdier | 152/209 R |
| 4,122,879 | 10/1978 | Takigawa et al. | 152/209 R |

Primary Examiner—William A. Powell
Assistant Examiner—Thomas Bokan
Attorney, Agent, or Firm—Stevens, Davis, Miller & Mosher

[57] ABSTRACT

A tread for a road vehicle tire having a pattern having a land-to-sea ratio between 65% to 35% and 75% to 25% and a series of diagonally extending grooves, the axially inner ends of which enter the contact patch between tread and ground before the remaining part of the groove in forward movement of the vehicle.

35 Claims, 5 Drawing Figures

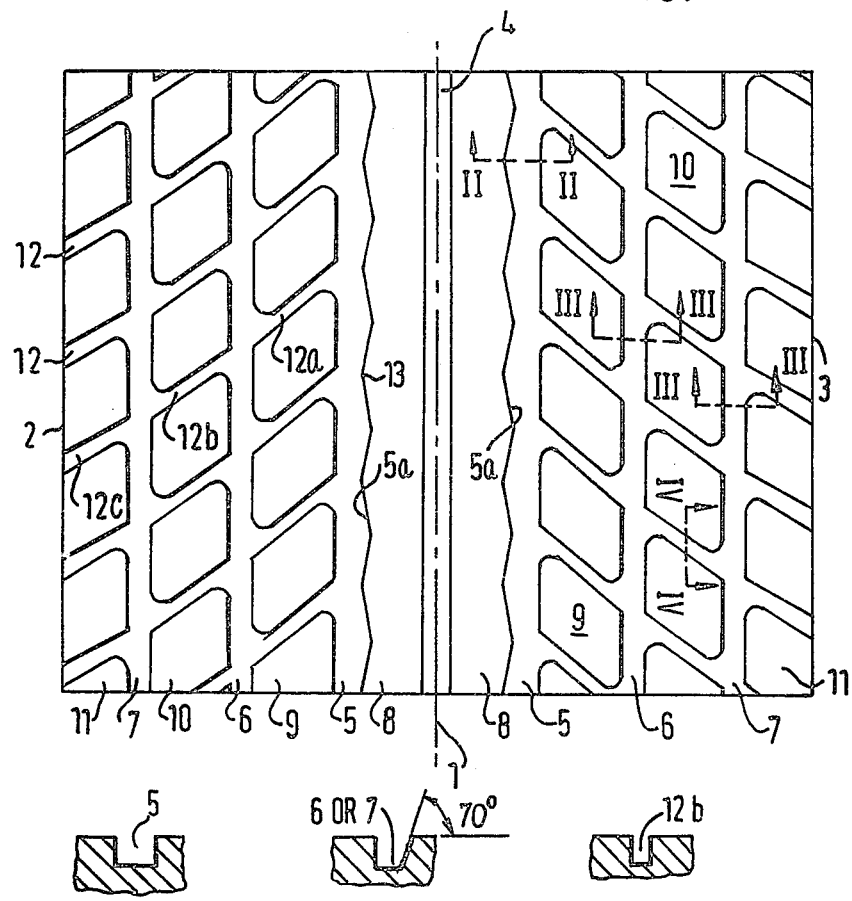

TIRES

This invention relates to tires and in particular the tread patterns of tires.

The fundamental reason for a tread pattern is to enhance the wet grip properties of the tire under the principal modes of braking, i.e. peak rolling, locked wheel sliding and cornering conditions. The tread pattern also affects tire-to-road noise generation, vehicle stability, the choice of tread compound and the tire rolling resistance. When a tire runs in wet conditions and the hydrodynamic pressure between the tire and contact patch on a wet road reaches the contact pressure of the tire, water penetration into the contact patch begins. If the hydrodynamic pressure then results in a deformation of the tire the more complex elastohydrodynamic condition is said to occur. Water penetrates the contact patch progressively from the front centre part of the contact patch producing in general a horse-shoe shaped contact patch which, with still further increase of hydrodynamic pressure causes the contact area to become narrow until the shoulders alone are in contact with the road surface. In general due to the shape of the contact patch the hydrodynamic pressure is greatest at the centre of the leading edge.

It is an object of the present invention to provide a tread arrangement which avoids the build up of the excessive hydrodynamic pressure particularly at the centre of the contact patch, and thus maximizes the wet grip properties of the tire.

The present invention provides a tread for a road vehicle tire having a pattern having an overall "land-to-sea ratio" (as defined herein) between 65% to 35% and 75% to 25% and comprising at each side of the centreline of the tread a plurality of circumferentially spaced-apart lateral grooves, every lateral groove extending outwardly at an angle between 30° and 70° to the centreline and the axially inward end of every lateral groove being behind the remainder of the groove in the contact patch so that in use of the tire on a road vehicle when the vehicle is moving forwards the axially inner end of a groove enters the contact patch between road and tire first, the remainder of the groove entering progressively afterwards.

Preferably, if one considers the tire tread to be divided into circumferential regions i.e. a central region which is symmetrically disposed relative to the tread centreline and extends either 8% or 10% of the total tread width on each side of said central line, two intermediate regions one on each side of the tread centreline and each extending axially outwards of the axially outer edge of the central region to a line which is positioned 20% of the total tread width away from the centreline, and two shoulder regions one on each side of the tread centreline each extending from the axially outer edge of the intermediate region on that side of the tire to the tread edge, then within the central region it is preferred that there is a minimum "land" area of 65% i.e. maximum "sea" area of 35%, within each intermediate region it is preferred that there is a minimum "land" area of 80% i.e. maximum "sea" area of 20% and within each shoulder region it is preferred that there is a minimum "land" area of 67% i.e. maximum "sea" area of 33%.

Preferably also in each region the axial width of the "land" area should increase from the central region to the intermediate region to the shoulder region. For example a typical ratio is 1:1.6:2.0.

Preferably each lateral groove extends to the edge of the contact patch which is at or adjacent to the shoulder region of the tire and is open to the axially outer edge of the tire tread. Each lateral groove may be continuous or made up of sections of lateral grooves in end-to-end relationship. The angle of the lateral groove may be constant over its length or may vary along the length of the groove or from section to section of the groove.

More preferably each lateral groove extends axially outwards at an angle in the range of 50° to 70° and one preferred lateral groove angle is 60° to the tread centreline. In another example the groove angle changes from 45° in the intermediate region to 60° in the shoulder region.

The lateral grooves may be of constant width measured perpendicular to the centreline of the groove or may increase in width towards the shoulders of the tire. Typical groove widths in the central region of the tread is between 2 and 4 mm and in the shoulder region is between 3 and 6 mm. A ratio of 1:1.5 is preferred with a maximum of 1:1.8.

Circumferential grooves may be provided in the tread and the width of these should also increase from the central region axially outwards. A preferred ratio of the width of a circumferential groove in the central region to the width of a circumferential groove in the shoulder region is 1:1.4.

Preferably the circumferential spacing of the lateral grooves is such that three or more lateral grooves are within the contact patch and preferably such that five or six lateral grooves are within the contact patch. The spacing of the lateral grooves is however chosen so that the tread rubber sections between adjacent lateral grooves remains stable so that even wear is obtained in service.

Slots having a definite volumetric capacity e.g. moulded by means of knife blades may be provided in the tread with a minimum spacing in any direction of 4 mm. Preferably the slots extend generally circumferentially and are open-ended i.e. they extend into an adjacent groove or other "sea" area.

The provision to angle the groove edges with respect to the tread surface to provide support for blocks under shear may be made. For example for a circumferentially extending groove the outer edge may be supported by changing the angle from 90° to for example 70° and for the lateral grooves the leading edge into the contact patch should be supported again e.g. by changing the angle from 90° to 70°. The provision may also be made to change the angle of the corresponding side of the groove to maintain a constant groove cross-sectional area.

The circumferential grooves are preferably generally straight but may be provided with slightly angled sidewalls to promote water flow into the lateral grooves and hence through the shoulders of the tire tread. The sidewalls may be angled in various ways but one preferred arrangement is to make the axially inner sidewalls of each circumferential groove in the form of a shallow saw tooth with an axially outward projecting apex a small distance in front of the entry to each lateral groove or lateral groove section so that water flowing along the circumferential groove towards the back of the contact patch is deflected towards the next lateral groove and encouraged to enter said lateral groove.

The invention also provides a radial tire having a breaker to stiffen the tread zone and a tread pattern as described above. In the case of a radial tire the tire tread of the present invention is particularly advantageous. It is also to be noted that not only does the tread of the invention provide improved wet drainage but also reduces noise generation.

By tire tread width is meant the distance measured axially across the tire tread between the outer points of which come into contact with the road surface under normal design service conditions with standard inflation pressures and load.

By "land-to-sea ratio" is meant the ratio of the ground contacting surface area of tread blocks and ribs to the imaginary ground contacting area of spaces between adjacent ribs and blocks provided for example by grooves.

Further aspects of the present invention will be made apparent in the following description by way of example only of two embodiments of the present invention. Reference will be made to the attached diagrammatic drawings in which:

FIG. 1 illustrates a section of a tire tread of the first embodiment;
FIG. 2 is a cross-section on line II—II of FIG. 1;
FIG. 3 is a cross-section on line III—III of FIG. 1;
FIG. 4 is a cross-section on line IV—IV of FIG. 1, and
FIG. 5 illustrates a section of a further tire tread of the second embodiment.

The tire tread of the first embodiment shown in part in FIG. 1 is for a 13 inch diameter tire with a 170 mm wide tread pattern (measured from edge-to-edge of the portion of the tread which comes into contact with the road surface under normal designed service conditions with standard inflation pressure and loads). The tire has a radial ply carcass and between the crown of the carcass and the tread region of the tire a breaker structure designed to stiffen the tread region and stabilize it.

The tread is what is commonly known as "unidirectional" i.e. the tire is designed to be fitted to the vehicle wheel in one particular way. As shown in FIG. 1 the top of the drawing is intended to enter the front of the tread contact patch before the remainder when the vehicle is moving forwards. As the tire rotates the top of the drawing will move towards the back of the contact patch, and the foot of the drawing will be on the front of the contact patch. The sketch shows a rectangular section of the tread and the true contact patch area will be approximately elliptical. The tread pattern is symmetrical to either side of the circumferential centreline 1 of the tire and the tread edges 2,3 are shown by straight lines parallel to the centreline 1. The grooves of the tread pattern are all moulded or cut at a nominal depth of 7 mm with vertical sides to the grooves except where otherwise stated.

A 6 mm wide central groove 4 extends along the centreline of the tire and thus divides the tread pattern into the two symmetrical sides mentioned above and one side will now be described.

The additional circumferential grooves 5,6 and 7 sub-divide the side of the tread into ribs 8,9,10 and 11, rib 11 being the shoulder rib of the tire tread. The first additional circumferential groove 5 has a width which varies from 6 to 8 mm due to its axially inner sidewall 5a being of sawtooth configuration so that the width of the rib 8 varies between 12 to 14 mm (the pitch of the sawtooth will be mentioned below) and has its axially inner sidewall straight. The cross-section of the first groove 5 is shown in FIG. 2. The second groove 6 is 5 mm wide and the second rib 9 is 18 mm wide. The third groove 7 is also 5 mm wide and the third rib 10 is also 18 mm wide. The remaining shoulder rib 11 is 15 mm wide. Both the second and third grooves 6 and 7 have the cross-section shown in FIG. 3 and have their axially outer sidewalls formed at an angle of 70° to the tread surface to provide support for the tread blocks in the final tread pattern.

A series of lateral grooves 12 are formed on each side of the tread centreline connecting the first groove 5 to the respective shoulders (2 or 3) of the tread. Each lateral groove 12 begins opposite an apex 13 on the sawtooth in the first groove 5 and extends towards the shoulder. The first section 12a of the groove 12 extends at an angle of 50° to the centreline 1 across the rib 9, the second section 12b extends at an angle of 55° across the rib 10, and the third section 12c extends at an angle of 60° across the rib 11.

The cross-section of each groove section 12a, 12b and 12c is rectangular as shown in FIG. 4 and sections 12a and 12b are 4 mm wide while section 12c is 4 mm and 5 mm wide at the axially inner and outer ends respectively. The groove widths are measured perpendicularly to their lengths at the point of measurement.

The lateral grooves 12 are spaced circumferentially to divide the ribs 9,10 and 11 into blocks. The blocks of the first rib 9 are 20 mm long measured circumferentially of the tire, the blocks in the second rib 10 are 20 mm long and the blocks in the shoulder rib 11 are 20-21 mm long, the variation being due to a tapering of the lateral groove.

The overall tread pattern is thus one of blocks with lateral grooves 12 extending from the centre of the contact patch to the shoulders of the tread at an angle of about 55° with the first part of the grooves 12 to contact the road surface near the centre of the contact patch. In use the pattern directs water axially outwards via the lateral grooves.

The tread of the tire just described has an overall land to sea ratio of 67.5% to 32.5% and the land to sea ratios of the various circumferential regions of the tire are set out in Table I.

TABLE I

| Region | Land to Sea Ratio |
| --- | --- |
| Central (± 8% Tread Width) | 64.8% to 35.2% |
| Intermediate (8% to 20% Tread Width) | 61.3% to 38.7% |
| Shoulder (20% to 50% Tread Width) | 69.0% to 31.0% |

In a modification of the tire tread illustrated in FIG. 1 the width of the centre groove is kept the same, the width of the two ribs 8 closest the tread centreline is increased from 12-14 mm to 18-21 mm, and the width of the grooves 5 narrowed by a corresponding amount. This modified tread has an overall land to sea ratio of 70.4% to 29.6% and the land to sea ratios of the various circumferential regions of the tire are set out in Table II.

TABLE II

| Region | Land to sea Ratio |
| --- | --- |
| Central (± 8% Tread Width) | 64% to 35.2% |
| Intermediate (8% to 20% Tread Width) | 77.4% to 22.6% |
| Shoulder | 69.0% to 31.0% |

TABLE II-continued

| Region | Land to sea Ratio |
|---|---|
| (20% to 50% Tread Width) | |

The tire tread of the second embodiment shown in part in FIG. 5 is for a 14-inch diameter tire with a tread pattern 126 mm wide (measured from edge-to-edge of the portion of the tread which comes into contact with the road surface under normal designed service conditions with standard inflation pressure and loads). The tire has a radial ply carcass and between the crown of the carcass and the tread region of the tire a breaker structure designed to stiffen the tread region and stabilize it.

The tread is what is commonly known as "unidirectional", i.e. the tire is designed to be fitted to the vehicle in one particular way so that as shown in FIG. 5 the top of the drawing is intended to enter the front of the tread contact patch before the remainder of that part of the tread shown when the vehicle is moving forwards. As the tire rotates the top of the drawing will move towards the rear of the contact patch and the foot of the drawing will become the front of the contact patch. Although the drawing shows a rectangular section of tire tread the true contact patch will be approximately elliptical.

The tread pattern is symmetrical to each side of the circumferential centreline 21 and the tire shoulders 22,23 are shown by straight lines parallel to the centreline 21. The grooves of the tread pattern are all moulded or cut at a nominal depth of 8 mm.

Along the centre of the tread extends a single zig-zag rib 24 having a pitch length of 29.7 mm. The width of the rib, measured at the ground-contacting surface is 12 mm, measured perpendicularly to the tread centreline, and the rib amplitude is such that each reflex-angled rib apex 25 is 9 mm from the centreline and each obtuse-angled rib apex 26 is 3 mm from the centreline.

Two zig-zag grooves 27, one on each side of the central rib 24, extend around the tire circumference. Each groove 27 has an axial width of 4 mm.

On each side of the central rib are two rows of blocks 29,30 separated in the axial direction by a straight circumferential groove 28, 6 mm wide. The two rows of blocks on one side of the central rib 24 are mirrored by the two rows on the other side of the rib, except for the fact that one pair of rows is displaced circumferentially with respect to the other by a distance equal to half the pitch length of the central rib 24. This distance is equal to the circumferential dimension of a block plus the width, measured in a circumferential direction, of a lateral groove 31, which separates one block from the next.

The blocks 29 in the axially inner row of each pair are each exactly the same. Each block is pentagonal in plan, one side 32 i.e. that further from the centreline, extends parallel thereto, two sides 33,34 are parallel and extend at an angle of 45° to the circumferential direction and two further sides 35,36 are adjacent one another and form a shallow V separated by an obtuse angle, as measured on the block surface. Each V lies axially opposite an obtuse-angled apex of the rib 26, the obtuse angle being measured in the groove bounding the rib 24. The circumferential length of a block 29 is 25 mm and the minimum and maximum axial widths are 17 mm and 23 mm respectively, the variation being due to the shallow "V" configuration of the two sides 35 and 36 adjacent the central rib 24.

The blocks 30 in the axially outer row of each pair, i.e. in each row adjacent the tread edge are all exactly the same. Each block is in the form of a parallelogram as seen in plan, two parallel sides 38,39 extending parallel to the circumferential centreline, and the other two parallel sides 40,41 extending at 60° to the circumferential direction.

The sections 31A of the grooves 31 between blocks 29 in the axially inner row of blocks 29 of each pair is 3.5 mm wide, measured perpendicularly to the groove length, and their axially inner end is immediately adjacent an outwardly-pointing, reflex angled apex 25 of the central rib 24. Thus water channelled along a groove 27 will tend to be deflected axially outwardly into a groove section 31A.

The sections 31B of the grooves 31 between blocks 30 in the axially outer row of each pair are 6.5 mm measured perpendicularly to the groove length. The axially inner end of each groove section 31B is adjacent the axially outer end of a groove section 31A, so that water deflected from a circumferential groove 27 into a groove section 31A flows in an unimpeded fashion through a groove section 31B to the tread edge.

As a modification, slots may be moulded in the tread blocks. Two alternative forms of slots are shown, closed slots 42 and 43 at the right hand side of FIG. 5, and open slots 44 and 45 at the left hand side.

The tire tread of the second embodiment has an overall land to sea ratio of 67.6% to 32.4% and the land to sea ratios in the various circumferential regions are given in Table III.

TABLE III

| Region | Land to Sea Ratio |
|---|---|
| Central (± 10% Tread Width) | 66.2% to 33.8% |
| Intermediate (10% to 20% Tread Width) | 80.1% to 19.9% |
| Shoulder (20% to 50% Tread Width) | 63.5% to 36.8% |

Tires having treads as just described have been found to have better wet-grip and reduced noise-generating properties than radial tires of similar size and type.

Having now described my invention—what I claim is:

1. A unidirectional tread for a road vehicle tire having a pattern with an overall "land to sea ratio" (as defined herein) between 65% to 35% and 75% to 25% and comprising at each side of the centreline of the tread a plurality of circumferentially spaced apart lateral grooves, every lateral groove extending outwardly at an angle between 30° and 70° to the centreline and the axially inward end of every lateral groove being behind the remainder of the groove in the contact patch so that in use of the tire on a road vehicle when the vehicle is moving forwards the axially inner end of a groove enters the contact patch between road and tire first, the remainder of the groove entering progressively afterwards.

2. A tread according to claim 1 wherein the minimum "land" area (as defined herein) in a central region, symmetrical relative to the tread centreline and extending 8 to 10% of the axial tread width, is 65%.

3. A tread according to claim 1 wherein the minimum "land" area (as defined herein) in an intermediate region, symmetrical relative to the tread centreline and extending 8 to 20% of the axial tread width, is 80%.

4. A tread according to claim 1, wherein the minimum "land" area (as defined herein) in the shoulder region, symmetrical relative to the tread centreline and extending 20 to 50% of the axial tread width, is 67%.

5. A tread according to claim 1 wherein the axial width of the "land" area increases from the central region to the intermediate region to the shoulder region.

6. A tread according to claim 5 wherein the axial width of the "land" area increases from the central region to the intermediate region to the shoulder region in the ratio 1:1.6:2.0.

7. A tread according to claim 1 wherein each lateral groove extends to the edge of the contact patch which is at or adjacent to the shoulder region of the tire.

8. A tread according to claim 1 wherein each lateral groove is open at the axially outer edge of the tire tread.

9. A tread according to claim 1 wherein each lateral groove is continuous.

10. A tread according to claim 1 wherein each lateral groove is made up of sections in end-to-end relationship.

11. A tread according to claim 1 wherein the lateral groove extends at a constant angle to the circumference over its length.

12. A tread according to claim 1 wherein the lateral groove extends at a varying angle to the circumference over its length.

13. A tread according to claim 1 wherein each lateral groove extends axially outwards at an angle in the range of 50° to 70° to the tread centreline.

14. A tread according to claim 1 wherein the groove angle changes from 45° in the intermediate region (as defined herein) to 60° in the shoulder region (as defined herein) each angle being measured with respect to the tread centreline.

15. A tread according to claim 1 wherein the lateral grooves are of constant width measured perpendicular to the centreline of the groove.

16. A tread according to claim 1 wherein the width of the lateral grooves increases towards the shoulders of the tire.

17. A tread according to claim 16 wherein the groove width measured perpendicular to the centreline of groove is between 2 and 4 mm in the central region of the tread and between 3 and 6 mm in the shoulder region of the tread.

18. A tread according to claim 1 wherein circumferential grooves are provided, the width of each one of these increasing from the central region (as defined herein) axially outwards.

19. A tread according to claim 18 wherein the ratio of the width of a circumferential groove in the central shoulder region (as defined herein) to the width of a circumferential groove in the region is 1:1.4.

20. A tread according to claim 1 wherein the circumferential spacing of the lateral grooves is such that at least three grooves are within the contact patch.

21. A tread according to claim 1 wherein the circumferential spacing of the lateral grooves is such that five grooves are within the contact patch.

22. A tread according to claim 1 wherein slots having a definite volumetric capacity are provided in the tread.

23. A tread according to claim 22 wherein the slots extend circumferentially.

24. A tread according to claim 22 wherein the slots are open-ended.

25. A tread according to claim 1 wherein the edge of a tread groove extends at 70° with respect to the tread surface.

26. A tread according to claim 1 wherein a straight circumferential groove is provided.

27. A tread according to claim 1 wherein a circumferential groove having a sidewall which is slightly angled to the circumference to promote water flow into a lateral groove is provided.

28. A tread according to claim 27 wherein the axially inner sidewalls of the circumferential groove is in the form of a shallow sawtooth with an axially outward projecting apex a small distance in front of the entry to each lateral groove to encourage water to enter said lateral groove.

29. A tire having a tread according to claim 1.

30. A pneumatic tire having a breaker structure designed to stiffen the tread having a tread according to claim 1.

31. A pneumatic tire according to claim 30 which is a radial ply tire.

32. A tread according to claim 1, wherein the minimum "land" area (as defined herein) in the central region (as defined herein) is 64.8%.

33. A tread according to claim 1, wherein the minimum "land" area (as defined herein) in the intermediate region (as defined herein) is 61.3%.

34. A tread according to claim 1, wherein the "land" area (as defined herein) in the intermediate region (as defined herein) is 77.4%.

35. A tread according to claim 1, wherein the minimum "land" area (as defined herein) in the shoulder region (as defined herein) is 63.5%.

* * * * *